(12) United States Patent
Wojciechowski et al.

(10) Patent No.: US 6,619,322 B1
(45) Date of Patent: Sep. 16, 2003

(54) FAST-ACTING VALVE

(75) Inventors: Bogdan V. Wojciechowski, deceased, late of Yorktown, VA (US), by Faina F. Wojciechowski, administrator of the estate; Robert J. Pegg, Williamsburg, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/628,100

(22) Filed: Jul. 27, 2000

(51) Int. Cl.[7] .................................................. F16K 1/00
(52) U.S. Cl. ........................ 137/625.33; 251/64; 251/76
(58) Field of Search ....................... 137/625.33; 251/64, 251/76

(56) References Cited

U.S. PATENT DOCUMENTS

| | | | | |
|---|---|---|---|---|
| 3,219,063 A | * | 11/1965 | Schumann | 137/625.33 |
| 3,729,025 A | * | 4/1973 | Silvestrini | 137/625.33 |
| 4,300,595 A | * | 11/1981 | Mayer et al. | 137/625.33 |
| 4,344,449 A | | 8/1982 | Meyer | |
| 4,694,860 A | * | 9/1987 | Eidsmore | 137/614.21 |
| 5,398,724 A | * | 3/1995 | Vars et al. | 137/625.33 |
| 5,427,352 A | * | 6/1995 | Brehm | 251/64 |
| 5,485,868 A | | 1/1996 | Jaw et al. | |
| 5,878,991 A | * | 3/1999 | Krimmer et al. | 251/64 |
| 6,105,931 A | * | 8/2000 | Frank et al. | 251/129.15 |

OTHER PUBLICATIONS

Marks' Standard Handbook for Mechanical Engineers, E. A. Avalllone and Theodore Baumeister III, Eds., Ninth EditionMcGraw–Hill, pp. 14–9 and 14–35.
Burmister, L. C. et al., NASA SP–5019, NASA Contributions to Advanced Valve Technology, 1967.

* cited by examiner

Primary Examiner—John Fox
(74) Attorney, Agent, or Firm—Robin W. Edwards

(57) ABSTRACT

A fast-acting valve includes an annular valve seat that defines an annular valve orifice between the edges of the annular valve seat, an annular valve plug sized to cover the valve orifice when the valve is closed, and a valve-plug holder for moving the annular valve plug on and off the annular valve seat. The use of an annular orifice reduces the characteristic distance between the edges of the valve seat. Rather than this distance being equal to the diameter of the orifice, as it is for a conventional circular orifice, the characteristic distance equals the distance between the inner and outer radii (for a circular annulus). The reduced characteristic distance greatly reduces the gap required between the annular valve plug and the annular valve seat for the valve to be fully open, thereby greatly reducing the required stroke and corresponding speed and acceleration of the annular valve plug. The use of a valve-plug holder that is under independent control to move the annular valve plug between its open and closed positions is important for achieving controllable fast operation of the valve.

9 Claims, 16 Drawing Sheets

FAST-ACTING VALVE

ORIGIN OF THE INVENTION

The invention described herein was jointly made by an employee of the United States Government and an inventor having no contractual obligations to the Government who has elected not to retain title. The invention may be used by or for the Government for governmental purposes without the payment of any royalties thereon for therefor.

BACKGROUND OF THE INVENTION

1. Technical Field of the Invention

The present invention is directed to a fast-acting, high-flow valve. In particular, the invention relates to a valve with an annular valve plug and an annular valve seat.

2. Description of the Related Art

A very fast-acting valve is desirable in many applications including aircraft control systems, pulsejet engines, and chemical and pharmacological processes. Desirable features of a good fast-acting valve include: minimal leakage in the closed state, rapid switching between the closed state and the fully open state, accurate definition of closed and open states, short cycle time for repetitive applications, and large fluid flux through the valve in the open state.

Meyer describes a fast-acting valve in U.S. Pat. No. 4,344,449. In this valve, a specially shaped valve stem acts as a sliding gate to the pressurized fluid. An electromagnetic actuator drives the valve stem axially, which opens the valve. A sealed air chamber cooperates with the specially shaped valve stem to form a nonlinear gas spring that helps to return the valve to its closed state. This approach results in a rapid release of a short blast of pressurized gas. However, to reduce friction, sliding gate valves typically have small contact pressures, which leads to leakage when the differential fluid pressure across the valve is large.

A fast-acting high-output valve is disclosed by Jaw et. al. in U.S. Pat. No. 5,485,868. This valve comprises a series of pieces that are separated by motion guards and which are arranged so that all of the pieces come together at a common central location. The edges and radial periphery of each piece seal against a valve seat when the valve is closed. A hinge is provided for each piece such that a downward actuating force at the common central location causes the periphery of each piece to move upward, thereby providing an opening for fluid to flow. Concerns about the possibility of substantial leakage with this valve design motivated a continued search for an appropriate fast-acting valve.

A review of the various valve designs discussed by Burmeister, Loser and Sneegas in "NASA Contributions to Advanced Valve Technology" (NASA SP-5019) revealed no designs that satisfactorily achieved all of the desirable features of a fast-acting valve.

Although a well-designed plug valve could eliminate the leakage problem, a standard plug valve is difficult to open rapidly without long-term adverse effects. For instance, for a valve with a 100 mm$^2$ orifice area, a circular valve seat will have a diameter slightly greater than 11 mm. The fully open valve state requires that the gap between the valve plug and the valve seat be about half the distance between the edges of the valve seat, or approximately 5.5 mm in this case. To move the valve plug from a closed state to the fully open state in 0.5 ms requires the valve plug to have an average speed in excess of 10 m/s, thereby requiring an acceleration greater than 4000 g (where g is Earth's acceleration of gravity) during the valve opening. Such a large acceleration is difficult to achieve for a large number of cycles without inelastic deformation.

SUMMARY OF THE INVENTION

The present invention seeks to overcome the difficulties associated with prior valves by using an annular plug valve. The annular plug valve includes an annular valve seat that defines an annular valve orifice between the edges of the annular valve seat, an annular valve plug sized to cover the valve orifice when the valve is closed, and a valve-plug holder for moving the annular valve plug on and off the annular valve seat. The use of an annular valve orifice reduces the characteristic distance between the edges of the valve seat. Rather than this distance being equal to the diameter of the orifice, as it is for a conventional circular orifice, the characteristic distance equals the distance between the inner and outer radii (for a circular annulus). The reduced characteristic distance greatly reduces the gap required between the annular valve plug and the annular valve seat for the valve to be fully open, thereby greatly reducing the required stroke and corresponding speed and acceleration. Although annular valve seats and plugs have been used previously (for instance, see the concentric disk valves shown in FIG. 14.3.8 of *Mark's Standard Handbook for Mechanical Engineers*, Ninth Edition, McGraw-Hill Book Company, New York), their use has been confined to check-valve applications. In a check valve, opening and closing is not controlled directly, rather differential fluid pressures on opposing sides of the valve plug are responsible for opening and closing the valve. In the current invention, a valve-plug holder that is independently controlled moves the annular valve plug to open and close the valve. The independently controlled opening and closing of the valve is important for achieving controllable fast operation of the valve.

The annular plug valve requires a suitable actuator for imparting movement to the annular valve plug. Actuators that impart movement through an impact are desirable for this application because maximum velocity is reached over a very short time interval. A variety of impact actuators have been devised to meet the needs of the annular valve plug. These actuators comprise a shaft that is impacted at one end by an impactor. The acceleration of the shaft takes place only over the time interval in which the impactor maintains contact with the end of the shaft. The shaft achieves its maximum velocity at the end of the impact interval, which is very short. The ability to reach maximum velocity in a very short time interval is highly desirable for the valve actuator.

To close the annular plug valve rapidly, a short braking stroke is required. The dissipation of kinetic energy associated with the motion of the valve in a short braking stroke represents difficulties for known damping devices. Hence, a method of shock braking was devised. A shock brake can be considered as a spring with large internal damping, which is achieved by friction between bodies. This process requires first and second bodies to have locally substantially parallel contact surfaces that are inclined to a translation direction. Preferably the first body is shaped as a truncated cone and the second body is annular. As the first body translates axially, it impacts the second body. The bodies deform elastically. Mutual sliding of the respective contact surfaces occurs. During the sliding, frictional forces dissipate much of the kinetic energy. The remainder of the energy is stored in the elasticity of the bodies, most of which is dissipated frictionally as the bodies return to their original shapes. Multiple additional bodies can be used to enhance the performance of the shock brake.

BRIEF DESCRIPTION OF THE DRAWINGS

Other features and advantages of the present invention will become more fully apparent from the following detailed description, the appended claims, and the accompanying drawings.

Figure 1:
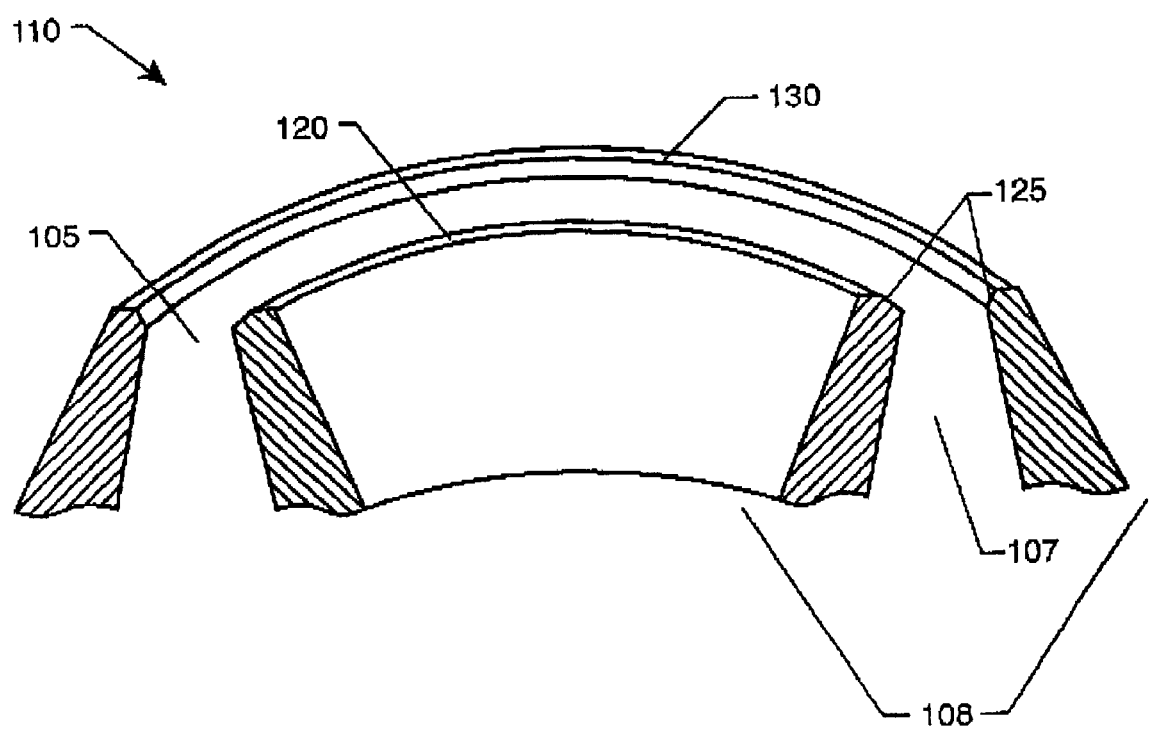
FIG. 1 shows a cutaway view of an annular valve seat.

Reference numerals in the figures correspond to the following items:
100 valve
105 valve orifice
106 fluid particle path
107 inner volume
108 outer volume
109 edge of circular seat
110 annular valve seat
120 inner slit edge
125 canted region
130 outer slit edge
140 annular valve plug
142 inner surface
144 outer surface
148 free surface
160 valve-plug holder
200 inner lip
210 inner lip ring
220 outer lip
230 outer lip ring
240 hard stop
250 $d_2$
260 $d_1$
290 holder body
292 inclined surface of holder body
300 holder-body flow-through hole
310 wire-spring hole
320 valve-plug biasing member
340 wire spring
370 shaft
380 first shaft end
390 second shaft end
400 impactor
402 attractor
405 impactor guide
406 upper shaft bearing
408 lower shaft bearing
410 electromagnet
411 core
412 wire coil
414 magnet holder
416 impactor return spring
417 impactor O-ring
420 anvil
428 shaped protuberance of the anvil
430 cam
440 rotating cylinder
450 return mechanism
455 spring support
460 return spring
470 shock brake
471 upper inclined surface of first annular ring
472 first annular ring
473 lower inclined surfaces of first annular ring
474 second annular ring
475 upper inclined surface of second annular ring
476 clearance between second annular ring and shaft
510 receiver
520 first body
525 inclined surface of first body
530 translation direction
540 second body
545 inclined surface of second body
560 large, essentially rigid mass
570 inclination angle
580 lower bearing
585 upper bearing
590 support shaft
600 inlet connector
610 inlet plenum
620 outlet plenum
630 outlet connector

DETAILED DESCRIPTION OF THE PREFERRED EMBODIMENTS

A cutaway view of an annular valve seat 110 is shown in FIG. 1. The annular valve seat 110 comprises an inner slit edge 120 and an outer slit edge 130 that define a valve orfice 105. The valve orifice 105, which will be considered as the opening between the inner slit edge 120 and the outer slit edge 130, separates an inner volume 107 from an outer volume 108. The outer volume 108 includes the volume in the vicinity of the annular valve seat 110 that is radially interior to the inner slit edge 120 and radially exterior to the outer slit edge 130. The canted portions 125 of the inner slit edge 120 and the outer slit edge 130 are included in preferred embodiments of the annular valve seat 110. The canted portions 125 improve the flow through the orifice 105 and reduce the sealing area of the annular valve seat 110, thereby increasing the surface contact pressure and improving the seal. The most preferred embodiments include a small, but finite sealing area, as indicated in FIG. 1.

Figure 2:
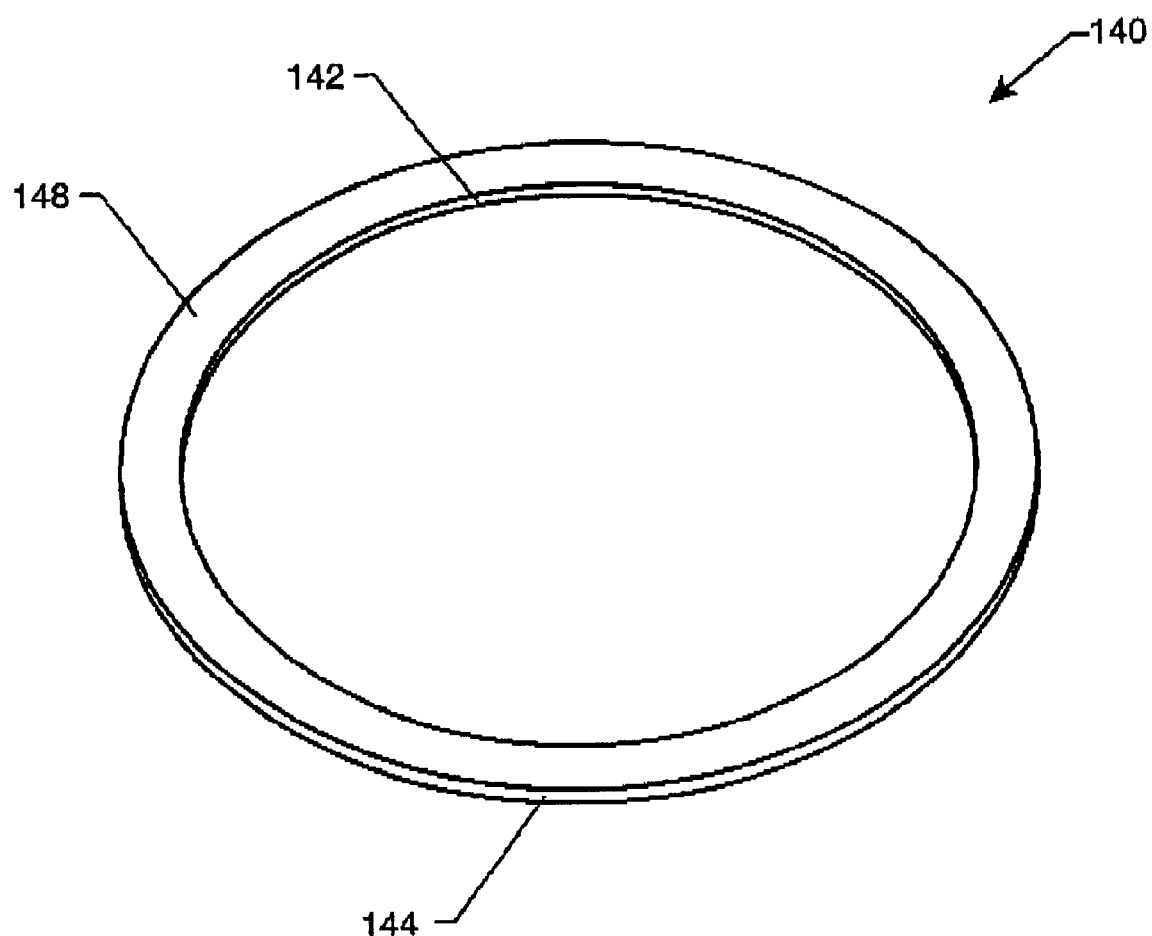
FIG. 2 shows a perspective view of an annular valve plug.
Figure 3:
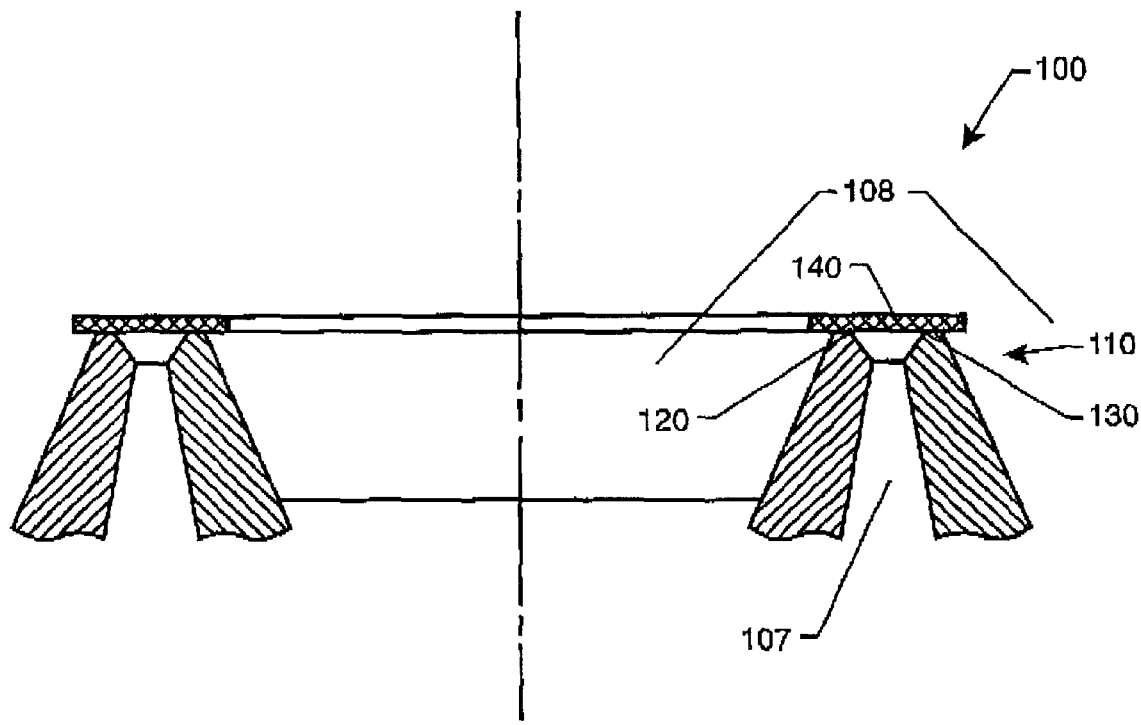
FIG. 3 illustrates a cross-section of an annular valve seat with an annular valve plug seated thereon.
Figure 4:
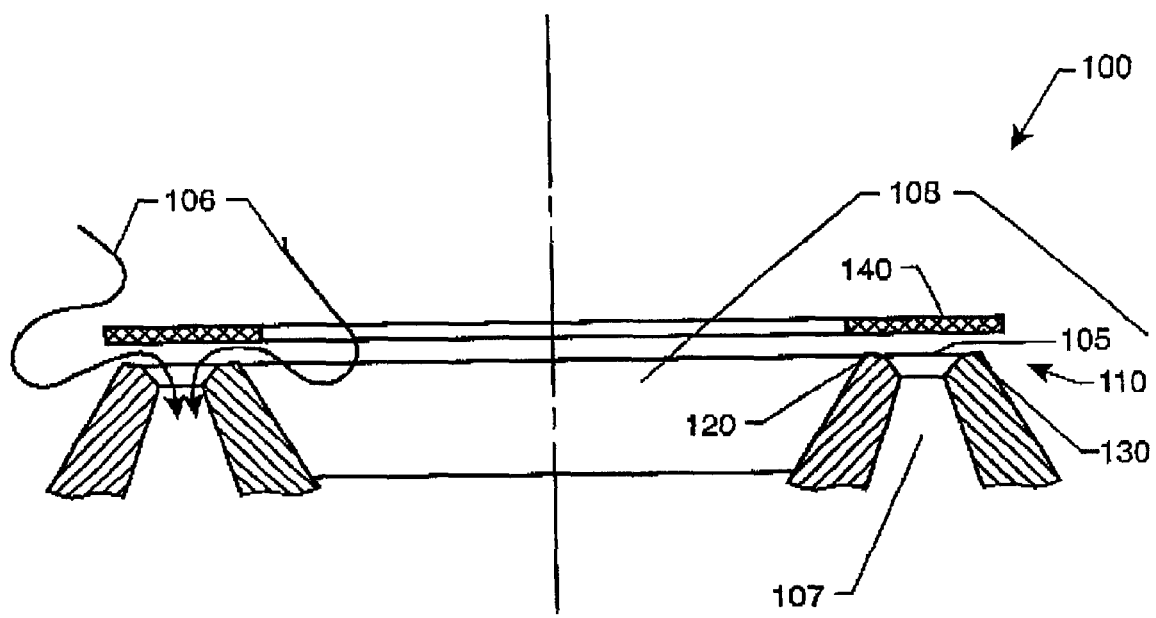
FIG. 4 illustrates a cross-section of an annular valve seat with an annular valve plug lifted off the annular valve seat.

FIG. 2 shows a perspective view of an annular valve plug 140 that has an inner surface 142, an outer surface 144, a sealing surface (obscured in FIG. 2), and a free surface 148. As shown in cross-section in FIG. 3, the annular valve plug 140 cooperates with the annular valve seat 110 to form a valve 100. The configuration shown in FIG. 3 illustrates the valve 100 in a closed state. In the closed state, the annular valve plug 140 is in sealing contact with the annular valve seat 110 such that little or preferably no fluid communication occurs between the inner volume 107 and the outer volume 108. FIG. 4 shows the valve 100 in an open state. In the open state, fluid communication between the inner volume 107 and the outer volume 108 is facilitated.

In the preferred mode of operation, fluid is supplied at high pressure to the outer volume 108. With the valve in the open state, the fluid flows through the valve orifice 105 into the inner volume 107. Example fluid particle paths 106 are shown to suggest some typical trajectories of fluid particles. The flow through the valve orifice 105 is accompanied by viscous and turbulent losses. A well-designed valve minimizes these losses for a given flow rate through the valve. One approach for reducing losses is to increase the fluid communication area across which the fluid can flow from the outer volume 108 to the inner volume 107 when the valve 100 is in the open state. Such an approach has been employed in this invention. The use of an annular valve seat 110 rather than a more conventional disk serves to increase the fluid communication area without changing the gap size or the geometrical size of the orifice 105.

As an example of the increased fluid communication area available with the present invention, consider a preferred embodiment in which the inner slit edge 120 is circular with a radius $R_I$ and the outer slit edge 130 is circular with a radius $R_o$ and concentric with the inner slit edge 120. For the preferred embodiment, the gap $G_o$ between the annular valve plug 140 and the outer slit edge 130 is constant around the circumference and is equal to the gap $G_i$ between the annular valve plug 140 and the inner slit edge 120, hence $G_i=G_o=G$. Therefore, the fluid communication area is $2\Pi G(R_o+R_i)$.

Figure 5:
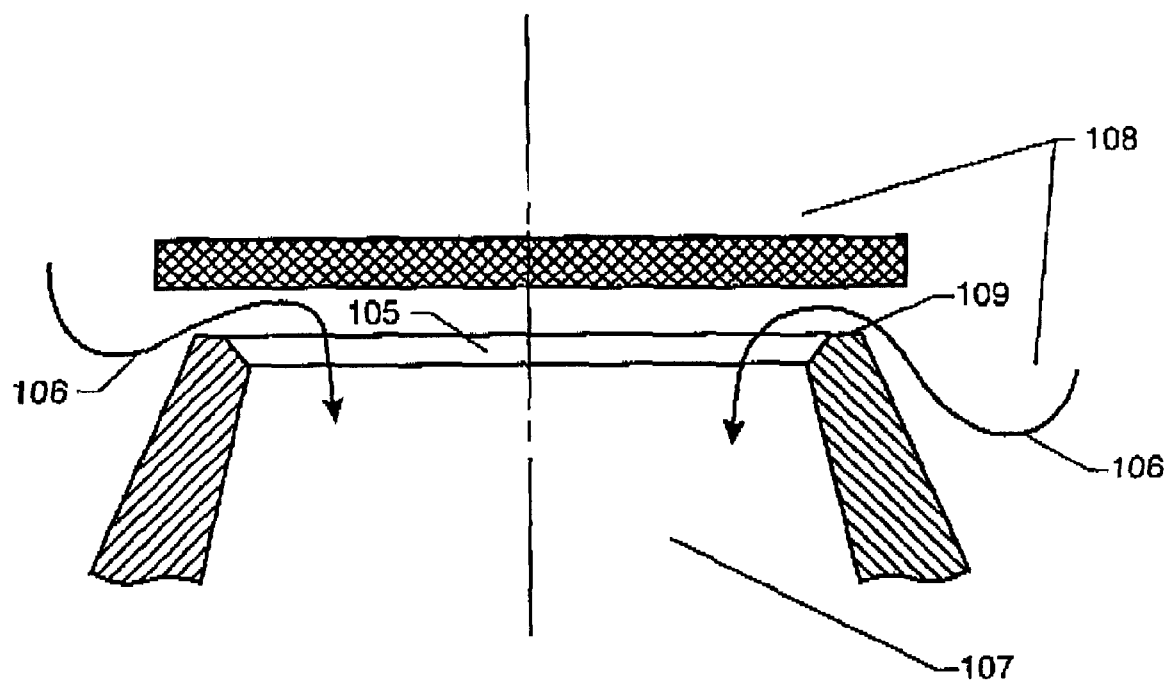
FIG. 5 shows a cross section of a conventional circular valve seat and plug.

In contrast, FIG. 5 shows a cross sectional view of a conventional valve with a solid disk used as a valve plug and a valve seat with a single continuous edge 109 of radius $R_c = \sqrt{(R_o+R_i)(R_o-R_i)}$. Such a relationship between the radius of the conventional valve and the radii of the annular valve is necessary to maintain the same geometrical area of valve orifice 105. Using the same gap G between the valve plug and the valve seat, the fluid communication area is $2\pi G R_c = 2\pi G \sqrt{(R_o-R_i)(R_o+R_i)}$.

Because $\sqrt{(R_o-R_i)(R_o+R_i)} < (R_o+R_i)$ for all positive values of $R_i$, the fluid communication area of the new annular valve is greater than that of a conventional valve.

Figure 6:
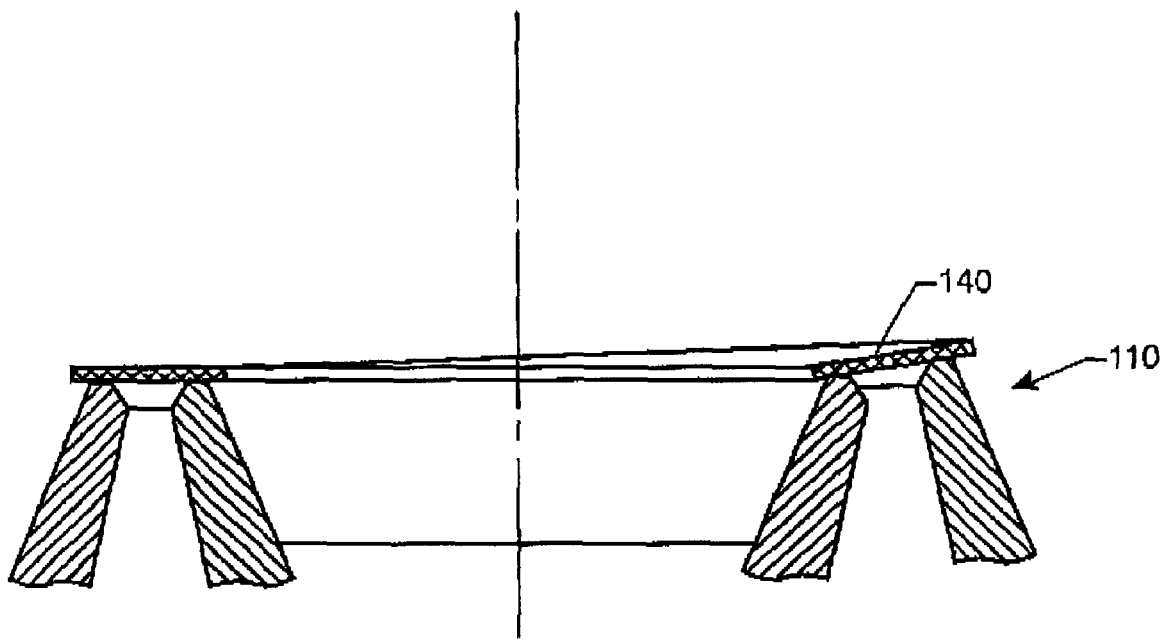
FIG. 6 shows a cross section of an annular valve seat with slit edges that are uneven. An annular valve plug is shown flexing to seal against the annular valve seat.

Another advantage of the current annular valve, as compared with a conventional valve, is related to the improved sealing capability for non-ideal conditions. In the preferred embodiments, the annular valve plug 110 is a flat resilient membrane in the shape of a circular annulus with concentric inner surface 142 and outer surface 144. Most preferably, the membrane is a metallic or ceramic compound, which allows the valve to be operated under extreme temperature conditions. In some embodiments, the annular valve plug 110 is coated with an elastic coating, such as one that includes polytetrafluoroethylene (sold commercially as TEFLON). The coating aids in providing a tight seal to the annular valve seat 110 when the valve is in the closed position. In the preferred embodiments the inner slit edge 120 and the outer slit edge 130 have the same height, so that the annular valve plug 140 remains flat when in sealing contact with the edges of the annular valve seat 110. However, in practice, deviations from the ideal conditions are expected. In particular, temperature nonuniformities in the annular valve seat 110 can vary the heights of the slit edges, as is shown in FIG. 6. These height differences can vary around the circumference. The preferred annular valve plug 140 has sufficient flexibility to conform to the height changes and maintain a good seal. In contrast, a conventional valve plug is typically insufficiently flexible to conform to circumferential height variations of the valve seat, thereby leading to valve leaks.

An annular valve plug 140 with concentric inner and outer surfaces is most preferred; however, embodiments of the invention with nonconcentric and even noncircular planforms of the inner and outer surfaces are included within the meaning of annular valve plug 140. Similar changes to the geometry of the annular valve seat 110 are possible and are included within the definition of annular valve seat 110. Preferably, the geometries of the annular valve plug 140 and the annular valve seat 110 are similar, with the annular valve plug 140 simply scaled to ensure that the annular valve plug 140 can seal against the edges of the annular valve seat 110. Additionally, although a flat membrane is preferred for the annular valve plug 140, alternate embodiments with a thick and/or contoured annular valve plug 140 are also included within the meaning of annular valve plug 140.

Although not necessary to the invention, leakage in the valve-closed state is reduced if the annular valve seat 110 and the annular valve plug 140 have their mating surfaces ground flat. Preferably a diamond grinder with an average roughness height between approximately 150 and 300 angstroms is used to achieve the desired smooth surfaces. Sealing is generally improved with the use of a thin flat membrane as the annular valve plug 140. The thin membrane's flexibility helps ensure a tight seal.

Figure 7:
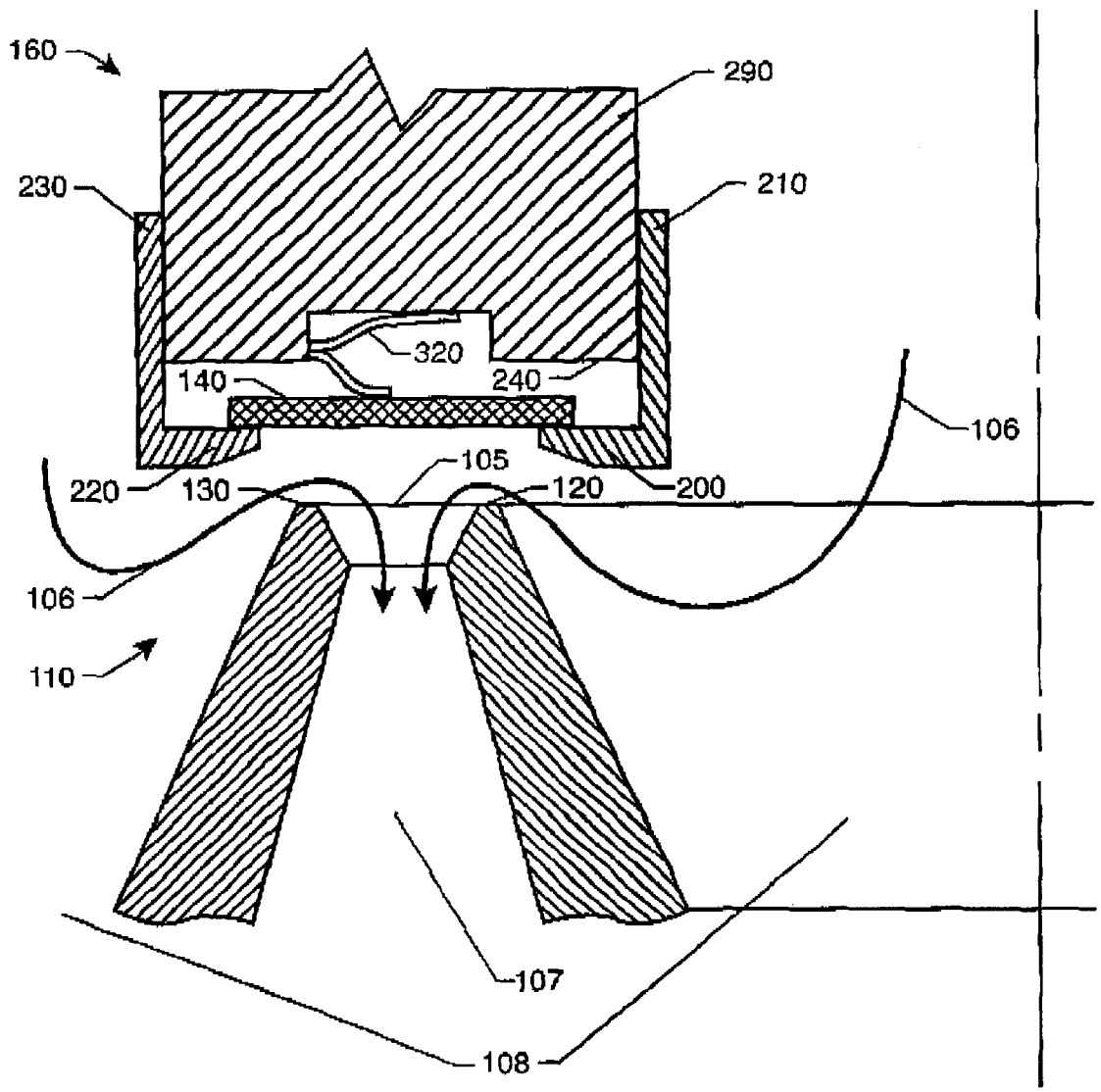
FIG. 7 illustrates a cross section of an annular valve seat and an annular valve plug being supported by a valve-plug holder. The valve is shown in an open position.

With reference to FIG. 7, movement of the annular valve plug 140 is enabled through the use of a valve plug holder 160. The ability to independently control the movement of the annular valve plug 140 through an actuator distinguishes the present invention from previous concentric disk valves, which have been used as check valves. In a check valve, the differential pressure of the fluids on either side of the valve plug determines whether the valve is open or closed. Here, a valve plug holder 160, which is controlled by an actuator, applies a force to the annular valve plug 140 that shifts the valve between its open and closed states. Independent control means that the valve state can be changed without regard to the fluid pressures in the inner volume 107 and the outer volume 108. Preferably, the valve plug holder 160 lifts the annular valve plug 140 from the annular valve seat 110. However, alternative embodiments in which the valve plug holder 160 resides in the inner volume 107 and pushes the annular valve plug 140 off the annular valve seat 110 are encompassed within the meaning of valve plug holder 160. In the preferred embodiments, the valve plug holder 160 is annular; however, the valve plug holder 160 is not necessarily circumferentially continuous. In some embodiments, the valve plug holder 160 engages the annular valve plug 140 continuously around the inner and outer circumferences of the annular valve plug. In other embodiments, the engagement occurs only at discrete intervals. To simplify FIG. 7, only a cross-section showing an engaging portion on the left side of the axis is shown. Therefore, the inner side of the valve plug holder 160 is to the right and the outer side of the valve plug holder 160 is to the left. In a preferred embodiment, the valve plug holder 160 comprises a holder body 290, an inner ring 210 coupled to the inner surface of the holder body 290, and an outer ring 230 coupled to the outer surface of the holder body 290. The inner ring 210 terminates in an inner lip 200 and the outer ring 230 terminates in an outer lip 220. The movement of the annular valve plug 140 is constrained by the inner and outer lips 200 and 220 from below and by a hard stop 240 of the holder body 290 from above.

In FIG. 7, the valve-plug holder 160 has raised the annular valve plug 140 off the annular valve seat 110, thereby positioning the valve in an open state. Example particle paths 106 are shown. A valve-plug-biasing member 320 biases the annular valve plug 140 towards the inner and outer lips 200 and 220, respectively.

Figure 8:
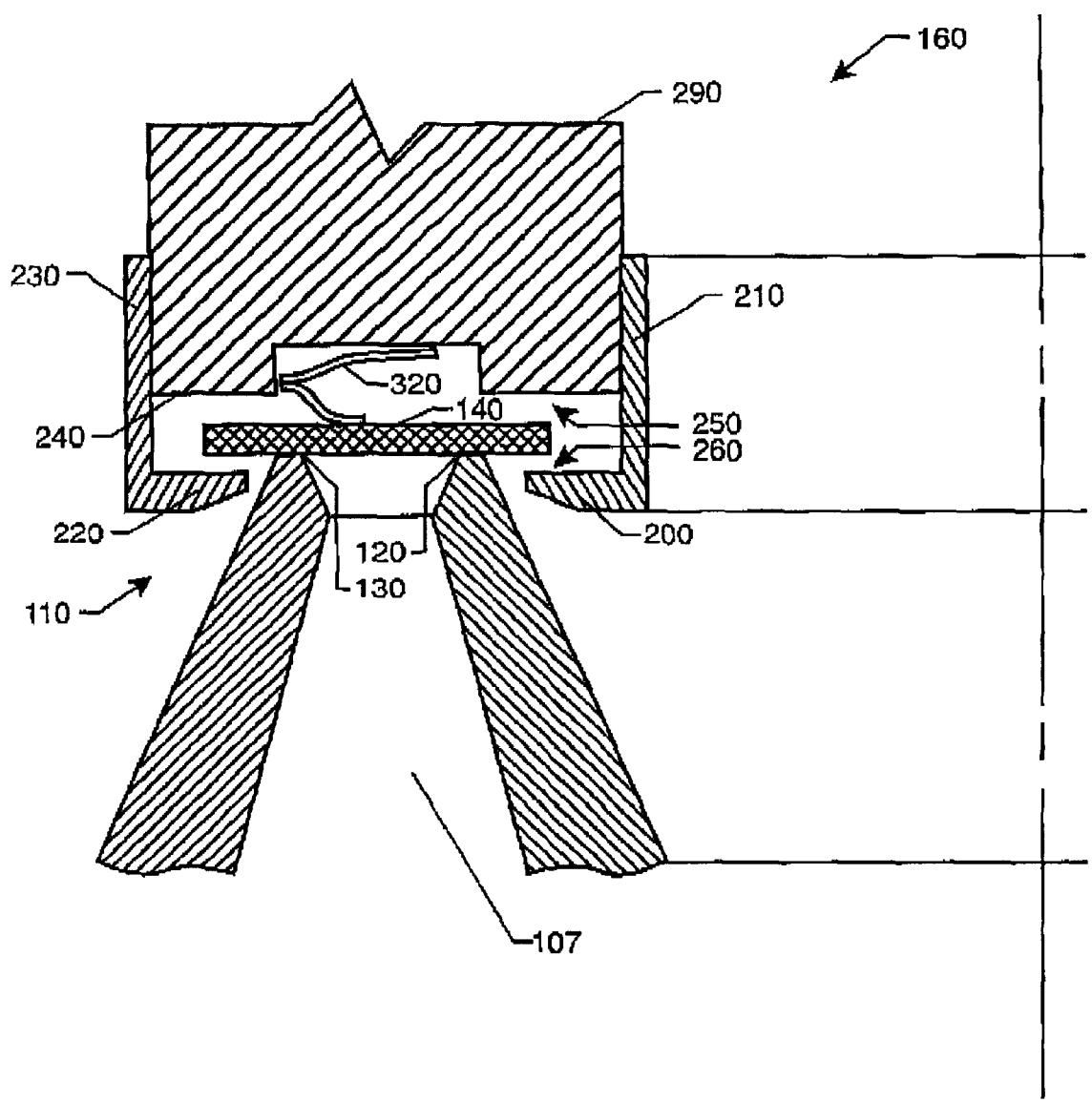
FIG. 8 shows the valve of FIG. 7 in a closed position.

In FIG. 8, the valve is in a closed state because the annular valve plug 140 is in sealing contact with the annular valve seat 110. The valve-plug-biasing member 320 maintains the annular valve plug 140 on the annular valve seat 110. The distance from the annular valve plug 140 to the inner and outer lips 200 and 220 is designated $d_1$ and is indicated in FIG. 8 by reference numeral 260. Similarly the distance from the annular valve plug 140 to the hard stop 240 is designated $d_2$ and is indicated in FIG. 8 by reference numeral 250. The sum of the distances $d_1$ and $d_2$ is fixed for any given combination of valve-plug holder 160 and annular valve plug 140; however, the proportions of the total distance occupied by $d_1$ and $d_2$ are adjustable by varying the elevation of the valve-plug holder 160 in the closed position. The elevation is varied by the use of shims, a screw adjustment, or other means. Adjustments in $d_1$ and $d_2$ vary the timing details associated with opening and closing the valve.

Figure 9:
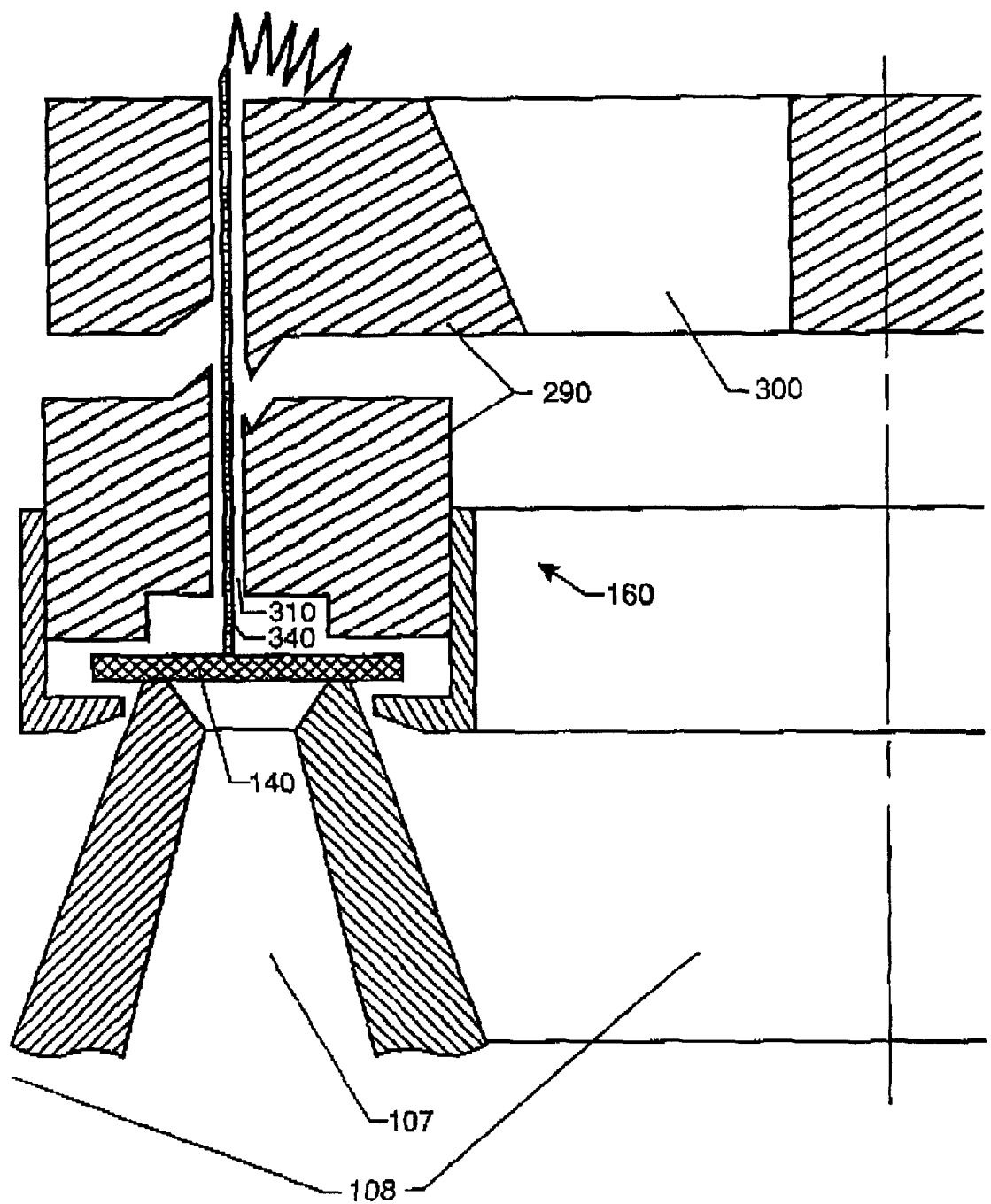
FIG. 9 shows the valve with a wire spring as the valve-plug-biasing member.

A variety of different structures are useful as the valve-plug-biasing member 320. Preferably, a mechanical spring is used. For instance, in FIGS. 7 and 8 a leaf spring is illustrated as the valve-plug-biasing member 320. The most preferred embodiments employ a wire spring 340 as shown in FIG. 9. The wire spring 340 is attached to the annular valve plug 140 and passes through a wire-spring hole 310 in the holder body 290 and is attached to the holder body 290. Also shown in FIG. 9 is a typical holder-body flow-through hole 300. The holder-body flow-through hole 300 allows fluid to flow to all portions of the outer volume 108.

Figure 10:
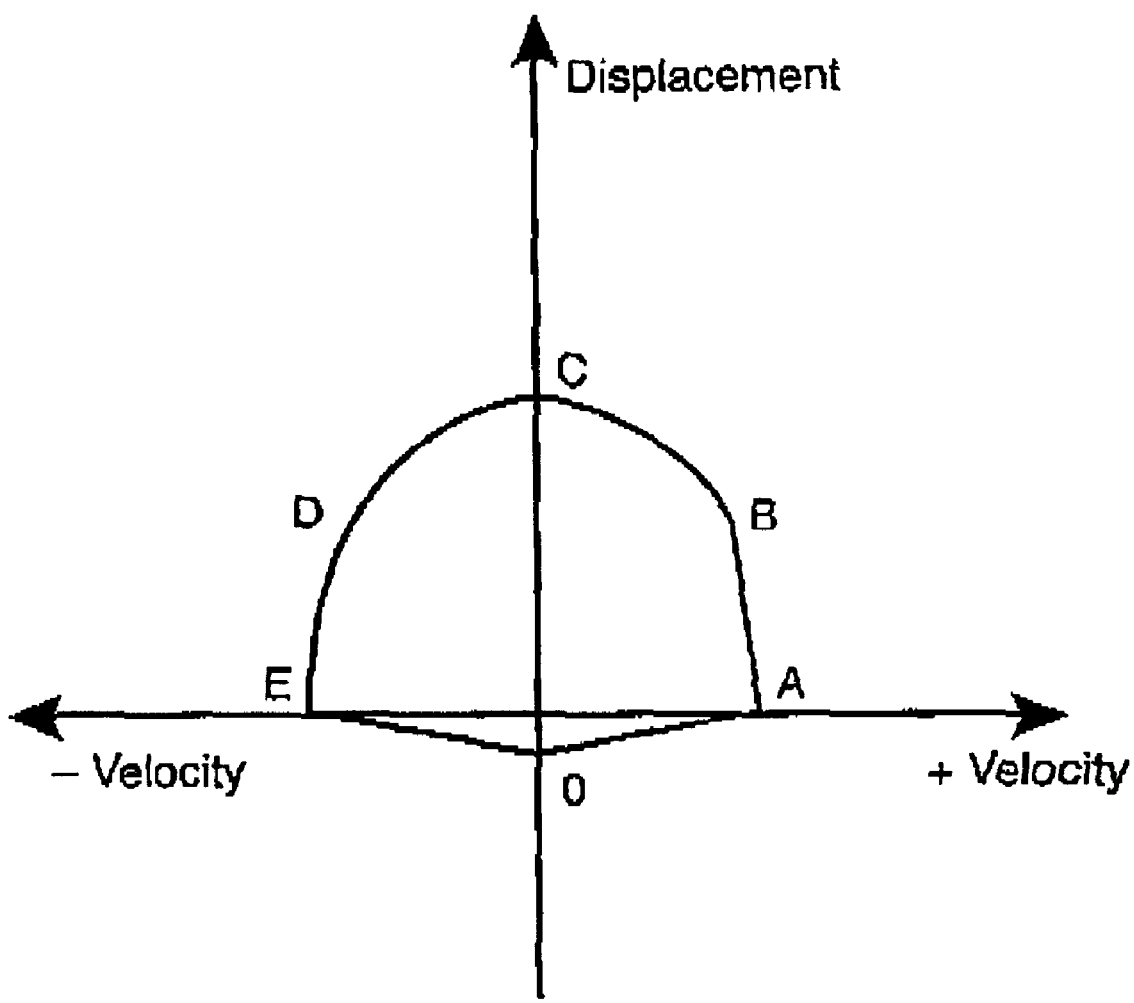
FIG. 10 shows a velocity-displacement trajectory for the valve-plug holder.

Ideally the valve of the present invention is either in the closed state or the open state. Time spent in intermediate states (i.e., not fully open nor closed) is generally undesirable. The flow rate through the valve during the transient period between the open and the closed states is difficult to estimate and difficult to control. FIG. 10 shows a velocity-displacement diagram for the valve-plug holder that will result in desirable valve performance. The velocity of the valve-plug holder is indicated on the horizontal axis and the displacement of the valve-plug holder is indicated on the vertical axis. At point O the valve-plug holder is at rest with the valve in the closed state (see FIGS. 8 and 9). Rapid acceleration of the valve-plug holder occurs between points O and A. During the time to traverse from O to A, the valve remains in the closed state because the annular valve plug remains sealed against the annular valve seat. At point A, the inner and outer lips of the valve-plug holder will contact the annular valve plug and begin to lift the annular valve plug off the annular valve seat. This event starts the transient opening that continues until point B. At point B, the annular valve plug has been lifted a distance equal to about half the slit width and the flow rate through the valve is approximately at its maximum. The valve is therefore considered to be in its open state (see FIG. 7). During the interval BCD, the valve is open. The closing transient is experienced from point D to E. At point E, the annular valve plug seals against the annular valve seat. A rapid deceleration that we shall call "shock braking" occurs from point E to point O. The curve BCDE approximates a parabola as a result of an almost constant return force causing the deceleration over this interval. The trajectory associated with FIG. 10 should be understood to be illustrative, rather than limiting. Other trajectories will also result in acceptable valve performance.

To rapidly switch from the open state to the closed state and back again requires a carefully designed actuator to interact with the valve-plug holder. The preferred type of actuator for use in the invention will rapidly accelerate the valve-plug holder from point O to point A of the trajectory shown in FIG. 10. To achieve this performance, the preferred actuator will take advantage of the dynamics associated with elastic-body collisions or impacts. The principles involved are discussed first with reference to the simple actuator shown in FIG. 11. Here, an impactor 400 is rapidly accelerated inside an impactor guide 405 by an explosion. The explosion develops high pressure that propels the impactor 400 to high speed. A shaft 370 has a first shaft end 380 that is coupled to a receiver 510. In the case of the valve, the receiver 510 would be a structure that is linked to the valve-plug holder, (e.g., the holder body) but in general, the receiver can be any structure that requires translation. The shaft 370 includes a second shaft end 390 that is impacted by the impactor 400, thereby causing the rapid acceleration of the shaft 370. Preferably, both the impactor 400 and the second shaft end 390 of the shaft 370 are made from materials that will elastically deform with a high coefficient of restitution under the impact loads. The acceleration of the shaft 370 occurs only over the duration of the impact. Because the duration of impact for such collisions is generally quite small, the shaft 370 rapidly accelerates to its maximum speed.

Figure 12:
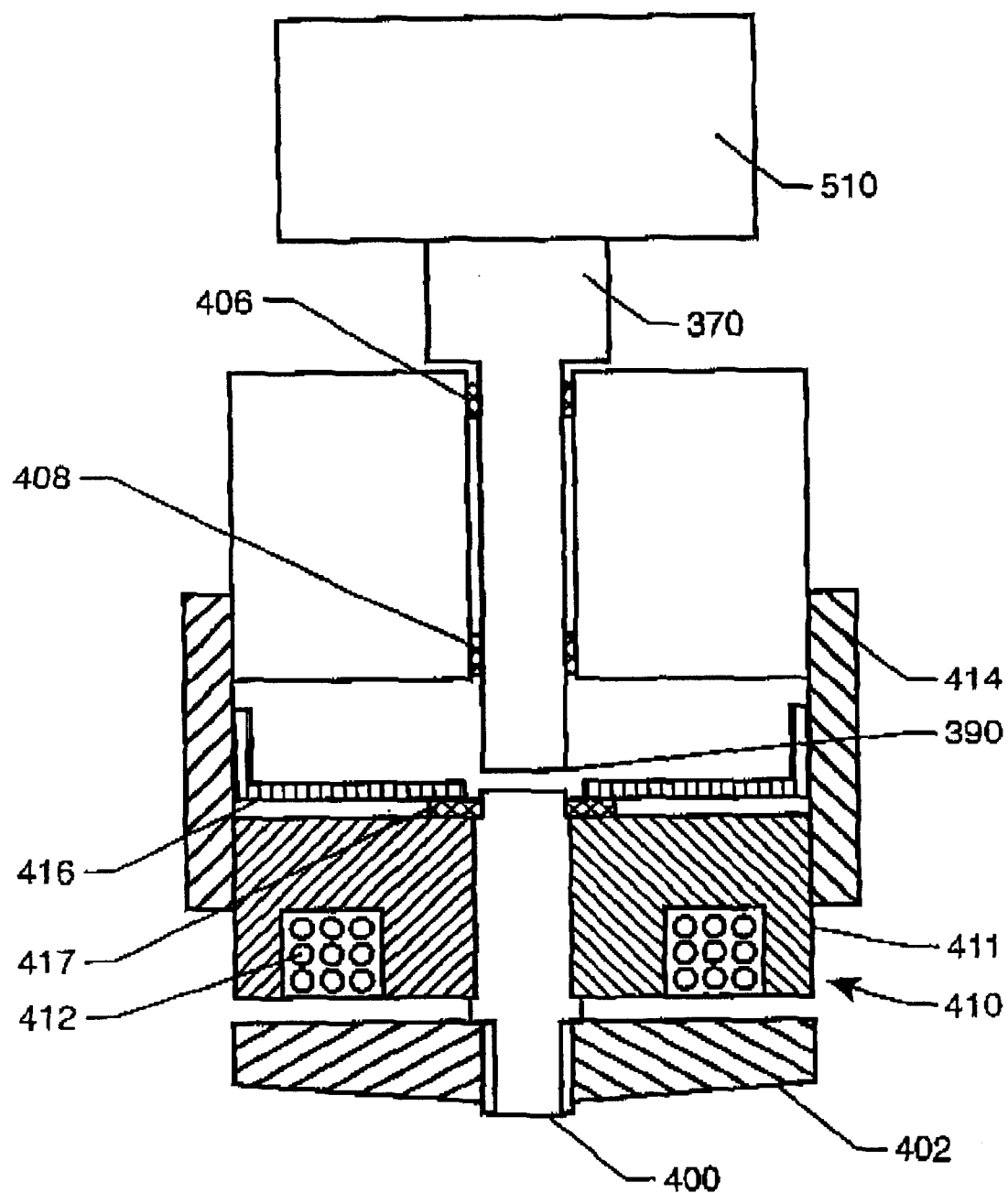
FIG. 12 illustrates an actuator with an impactor propelled by an electromagnet.

Another embodiment of the actuator is shown in FIG. 12. Here the impactor 400 is accelerated by the use of an electromagnet 410. In the preferred embodiment shown in FIG. 12, the impactor 400 is made from a diamagnetic material while a ferromagnetic material is used for an attractor 402 that is coupled to the impactor 400. A wire coil 412 is wound inside a core 411. Both the core 411 and an impactor return spring 416 are maintained in appropriate relationship with a magnet holder 414. Upper and lower shaft bearings 406 and 408, respectively, help guide the shaft 370 on which is mounted the receiver 510. In operation, when an electrical current is activated in the wire coil 412, it magnetizes the core 411, thereby generating a force that draws the attractor 402 towards the core 411. The motion of the attractor 402 forces the impactor 400 upward so it can impact the second shaft end 390 of the shaft 370. The impactor return spring 416 bears against the impactor O-ring 417 to return the impactor 400 and the attractor 402 approximately to their original positions when the electrical current is deactivated.

Figure 11:
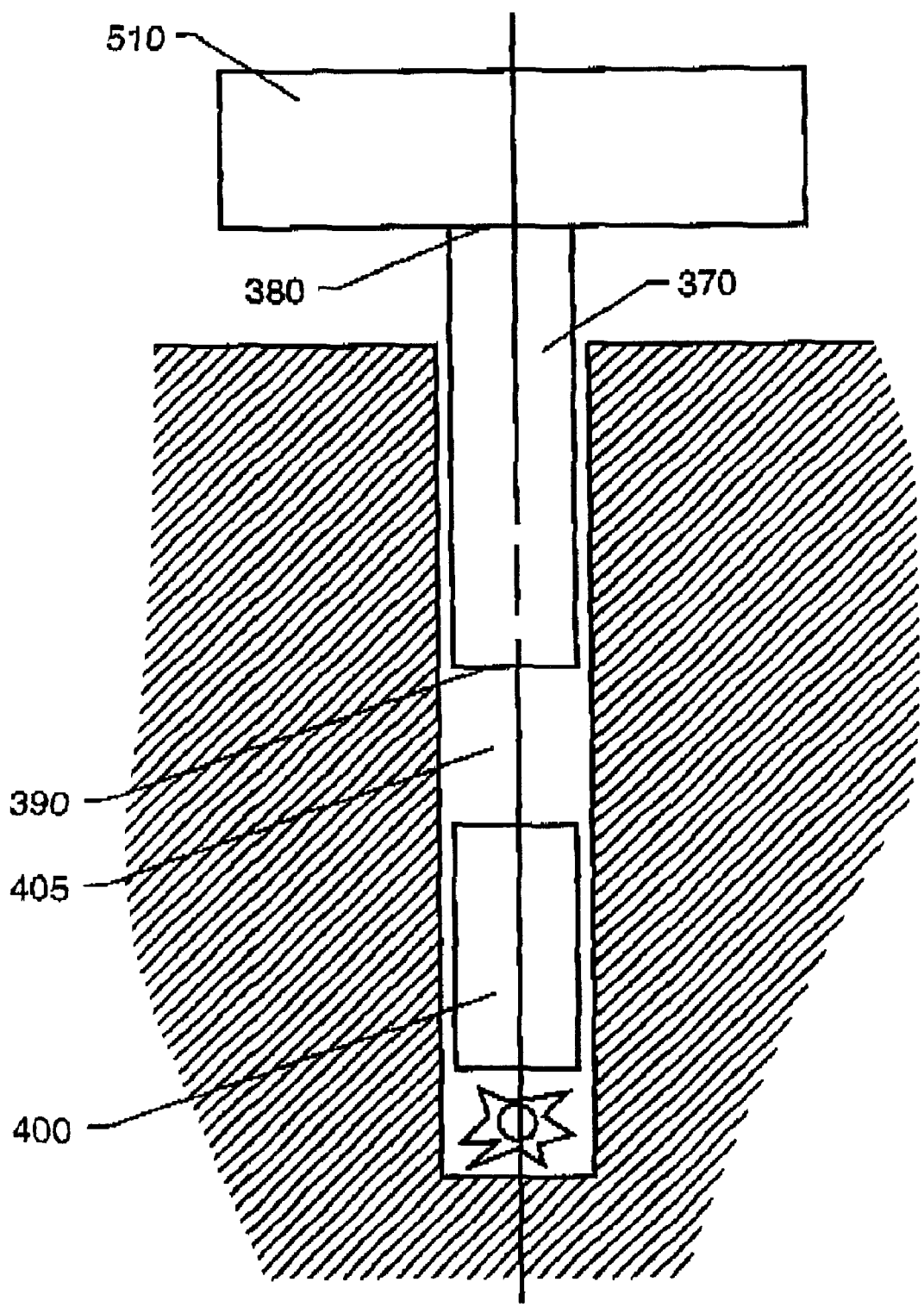
FIG. 11 illustrates an actuator with an impactor propelled by an explosion.

In the embodiments illustrated in FIGS. 11 and 12, the mass of the impactor 400 (and the attractor 402 if one is used) is preferably similar to the combined mass of the shaft 370 and the receiver 510. Controlling the event that initiates the acceleration of the impactor with a computer or a microprocessor is straightforward to one skilled in the art. After the impactor 400 achieves its maximum speed, the impact dynamics of the impactor 400 with the shaft 370 governs the acceleration of the shaft 370 and thereby of the receiver 510.

Figure 13:
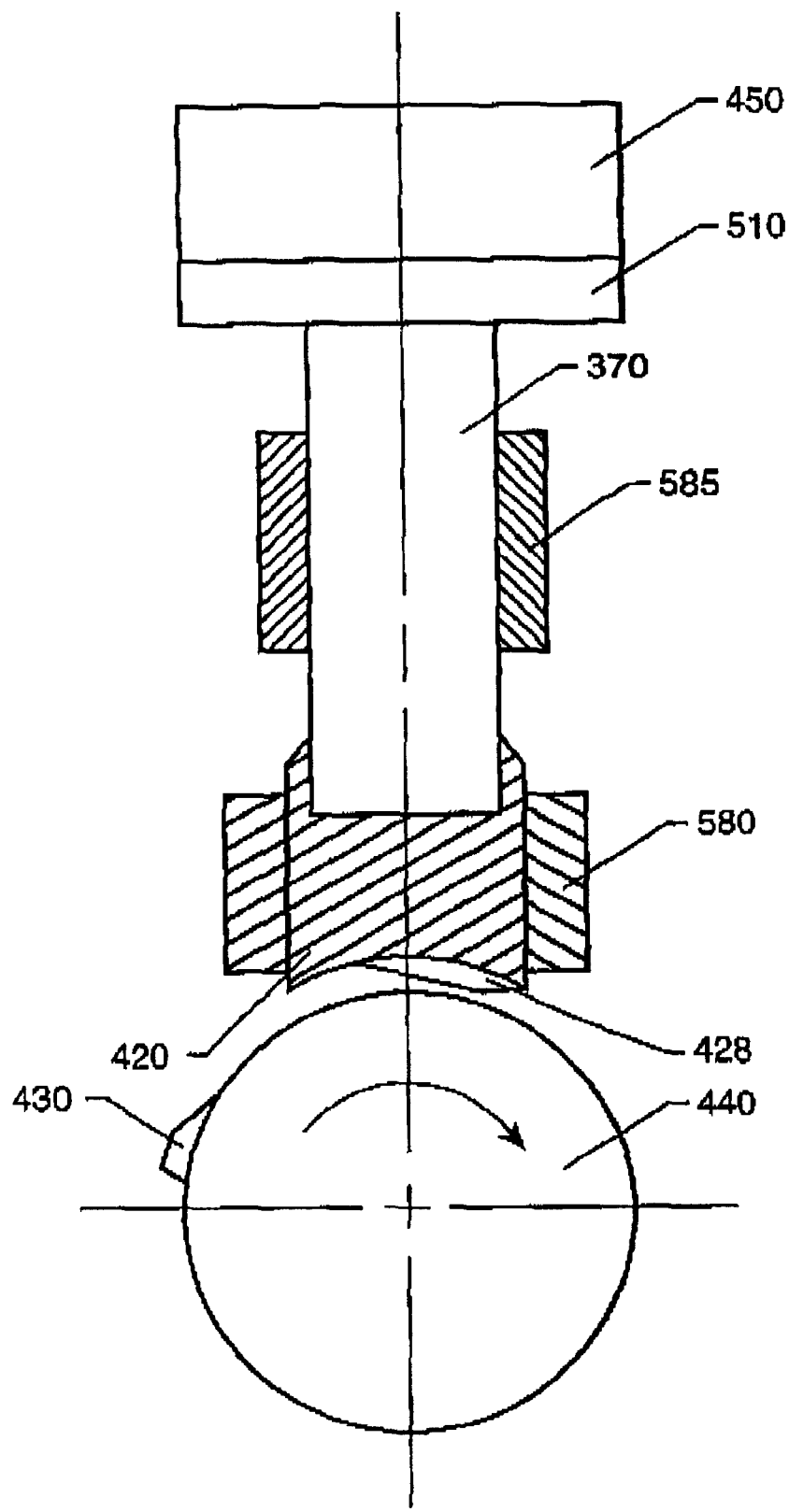
FIG. 13 shows an actuator wherein the impactor is a cam mounted on a rotating cylinder.

Another embodiment of an impact actuator is shown in FIG. 13. Here a cam 430 is fixed on a rotating cylinder 440.

An anvil 420 with a shaped protuberance 428 is fixed to the shaft 370. Preferably the protuberance 428 is shaped to provide a large impact area with the cam 430. The cam 430 rotates with the rotating cylinder 440 and impacts the protuberance 428 of the anvil 420. To endure a large number of impacts, the cam 430 and the protuberance 428 of the anvil 420 preferably include hard pads. These hard pads preferably are made from a pressurized mixture of the powders of several metals, including tantalum, titanium, cobalt, and tungsten. An example of such a mixture is the Russian-made material designated TT7K12. Preferably, the motion of the shaft 370 is restricted axially so that only the protuberance 428 of the anvil 420 can be struck by the cam 430. In addition, because the impact of the cam 430 with the anvil 420 imparts momentum that is perpendicular to the axis of the shaft 370 as well as momentum that is along the axis of the shaft 370, a bearing 580 is used to reduce any lateral movement of the anvil 420 and subsequently to the shaft 370. As with the other actuators discussed above, the impact accelerates the shaft 370, thereby accelerating the receiver 510. In this embodiment the impactor is the cam 430 and the protuberance 428 of the anvil 420 corresponds to the second shaft end. This embodiment is particularly well suited for periodic acceleration of the shaft 370. The speed of the rotating cylinder 440, and thereby the frequency of impacts can be computer controlled.

Figure 14:
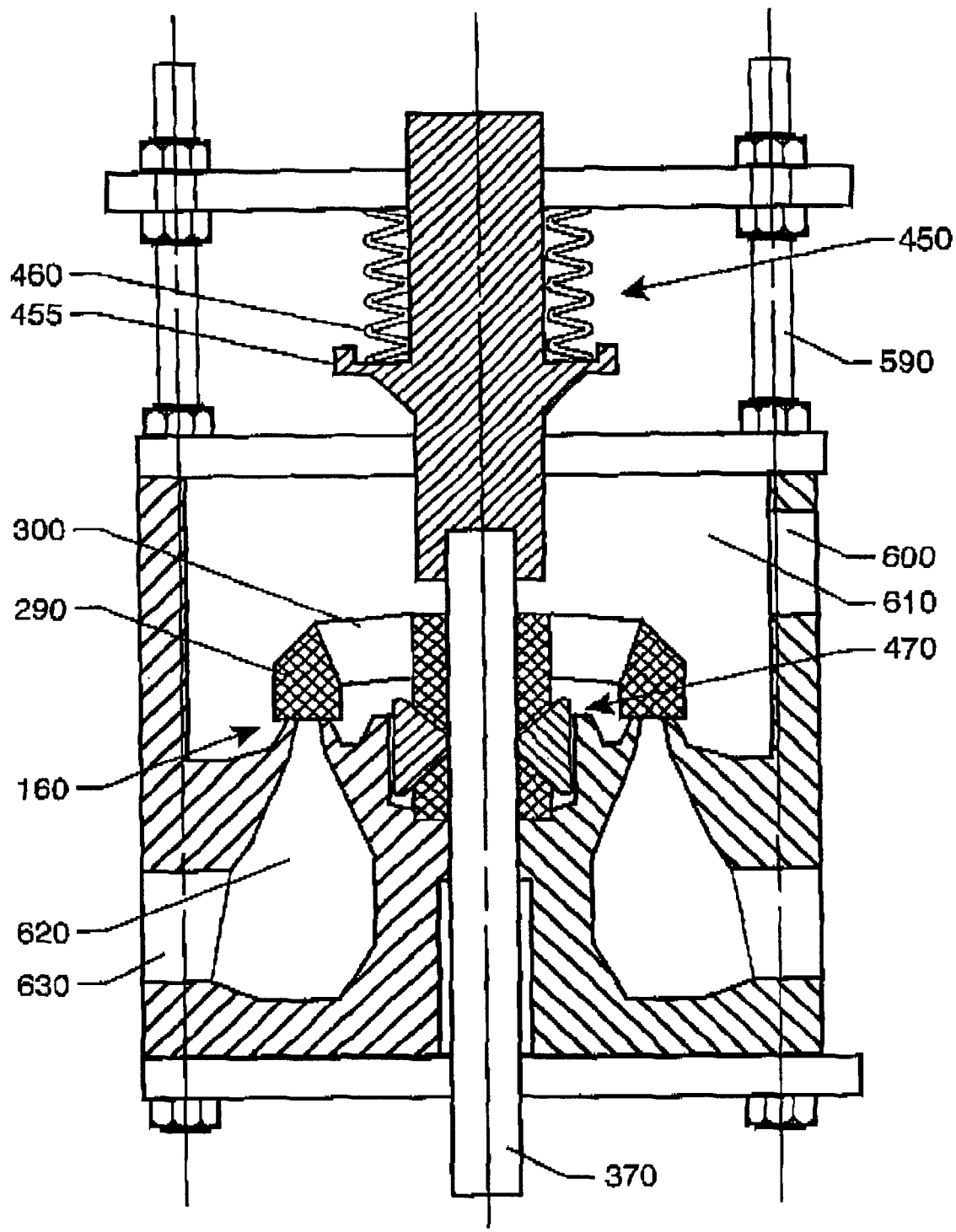
FIG. 14 shows an assembly of the valve with a return spring and a shock brake.

To be used in a cyclic mode, the actuator must have a means for returning the receiver 510 to its pre-actuation position. A return mechanism 450 is shown generically above the receiver 510 in FIG. 13. A preferred return mechanism 450 in combination with preferred embodiments of other portions of the valve are shown in FIG. 14. In this figure, the return mechanism comprises a spring support 455 and a return spring 460. In the embodiment shown in FIG. 14, the return spring 460 is a stack of Bellville springs. However, different types of springs may be used as the return spring 460. Here, the receiver is the holder body 290. In this embodiment, the holder body 290 includes holder-body flow-through holes 300. These holes are spaced periodically about the axis of the holder body 290. The holder-body flow-through holes 300 provide access of fluid in the inlet plenum 610 to the central portion of the valve (i.e., the volume 108 inside the inner slit edge 120 in FIG. 1). When the valve is in an open state, fluid flows from the inlet plenum 610 to the outlet plenum 620 where an outlet connector 630 facilitates the transit of the fluid to its desired destination.

In operation, upward motion of the shaft 370 urges the top of the shaft 370 against the spring support 455, thereby compressing the return spring 460, which subsequently forces the shaft 370 back to its pre-actuation position. To obtain a nearly parabolic trajectory of BCDE of FIG. 10, the restoring force provided by the return spring 460 must be nearly constant. This is achieved by precompressing the return spring 460 such that the additional compression of the spring caused by the displacement of the shaft 370 is small compared with the precompression. Other embodiments that employ different return mechanisms, such as, but not limited to, an elastomer or an air piston are also feasible.

Also shown in FIG. 14 is a shock brake 470. The shock brake 470 is designed to rapidly decelerate the valve-plug holder along the EO portion of the trajectory shown in FIG. 10. The distance over which this rapid deceleration occurs is the braking stroke. The shock brake 470 dissipates the kinetic energy associated with the motion of the shaft 370. The kinetic energy associated with the motion of the shaft 370 includes not only the kinetic energy of the shaft 370, but also that of structures connected to the shaft 370, such as the valve plug holder 160. The shock brake 470 can be considered as a spring with large internal damping, which is achieved by friction between bodies.

In the shock brake, a translating body that translates in an initial translation direction urges a first body in the initial translation direction against a second body. In the preferred embodiments described below, the translating body is the same as the first body, although this equivalence is not required. The process requires the first and second bodies to have substantially parallel contact surfaces that are inclined to the translation direction. Alternative embodiments include one or more additional bodies, wherein pairs of adjacent bodies have substantially parallel contact surfaces that are inclined to the translation direction. Mutual sliding occurs on the respective contact surfaces. During the sliding, frictional forces dissipate much of the kinetic energy. The remainder of the energy is stored in the elasticity of the bodies, which elastically deform as the translating body urges the first body against the second body (and if additional bodies are used, the second against the third, etc.). As the bodies restitute to their original shapes, energy is again dissipated frictionally as sliding occurs on the respective contact surfaces. The shock brake should be understood to include devices that rapidly decelerate the translating body primarily through frictional dissipation of kinetic energy along substantially parallel contact surfaces of adjacent bodies.

Figure 15:
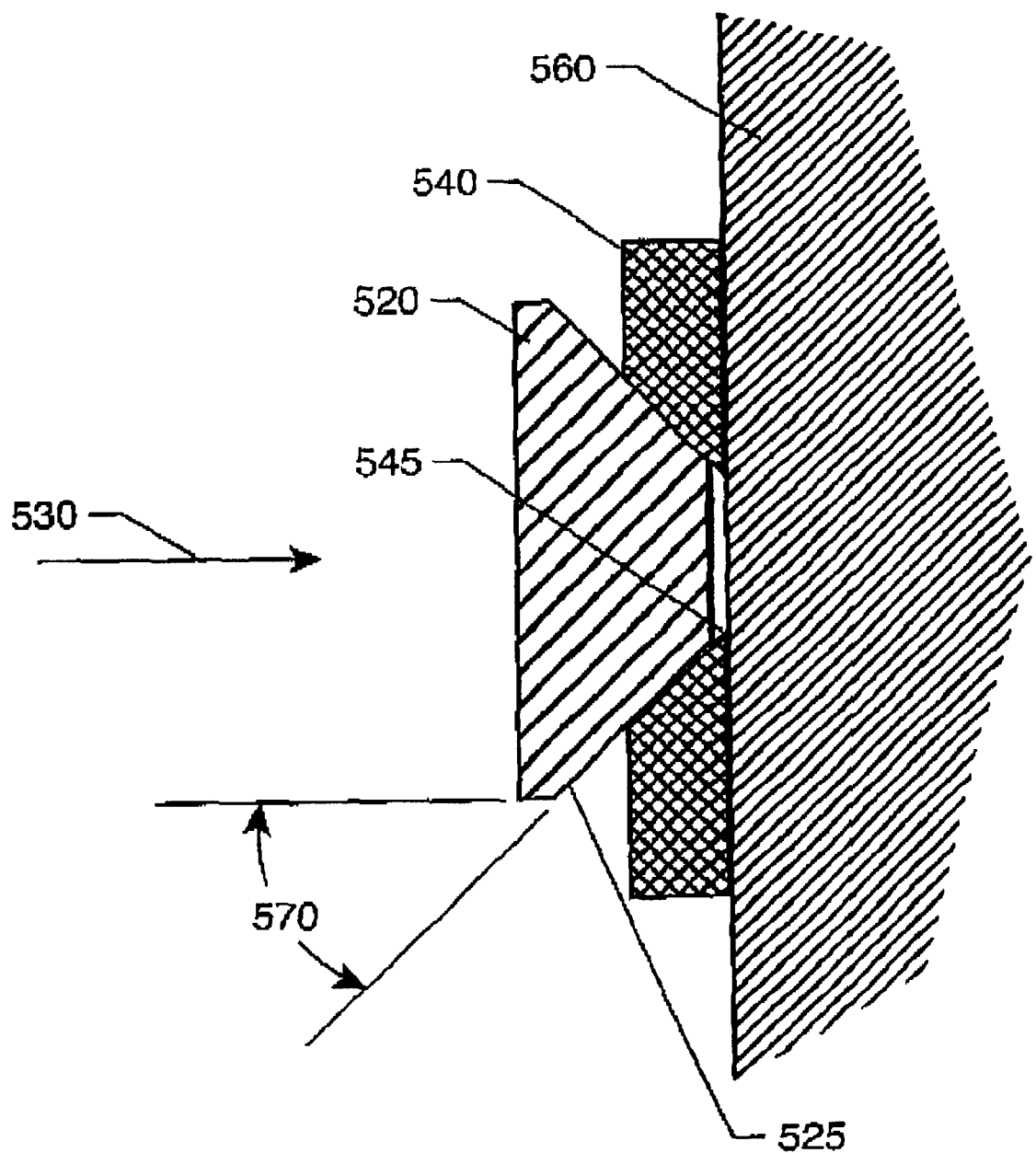
FIG. 15 shows a schematic cross-section of a shock brake.

The principles governing the shock brake are more easily understood with reference to the cross-sectional view in FIG. 15. In FIG. 15, a first body 520 has an inclined surface 525 with an inclination angle 570 to an initial translation direction 530. A second body 540 has an inclined inner surface 545. Preferably, the inclined surface 525 of the first body 520 and the inclined surface 545 of the second body 540 have the same inclination angle 570 and hence are parallel. The second body 540 is restricted from translating in the first direction 530 because it abuts a large, essentially rigid mass 560. In practice, this restriction is relaxed, but its imposition helps in understanding the mechanism of the shock brake. Although a variety of different shapes can be used for the bodies, visualization of the process is easiest if the first body 520 is considered as a truncated cone and the second body 540 is considered as an annular ring with a sloped inner surface.

In the preferred embodiments, the first body 520 is the same as the translating body so the process starts with the first body 520 translating in an initial translation direction 530. Its inclined surface 525 impacts the second body 540 along the inclined surface 545, which is inclined to the initial translation direction 530. The continued translation of the first body 520 causes the bodies to elastically deform. The elastic deformations produce elastic forces that increasingly urge the first body 520 in a direction opposite to the initial translation direction 530. In addition, a large frictional force develops along the inclined surfaces 525 and 545, resisting continued translation of the first body 520 and dissipating much of the kinetic energy of the first body 520. Eventually, the combined elastic and frictional forces bring the first body 520 to rest, whereupon the elastic forces push the first body 520 in a direction opposite to the initial translation direction 530. During the return motion, additional kinetic energy is dissipated by the frictional force along the inclined surfaces 525 and 545. In practice, deviations from the ideal operation are to be expected. For instance, in many embodiments, a force (such as that applied by a spring) urges the first body 520 in the initial translation direction 530, so oscillations might occur until all of the kinetic energy is dissipated. Another deviation from ideal operation might return the first and second bodies 520 and 540 only approximately to their pre-motion condition.

The preferred inclination angle 570 for the inclined surfaces 525 and 545 is approximately 45 degrees. With inclination angles 570 substantially different than 45 degrees, the bodies have a tendency to become stuck together because the frictional force exceeds the component of the elastic force that tends to return the first body 520 to its pre-motion position.

Figure 16:
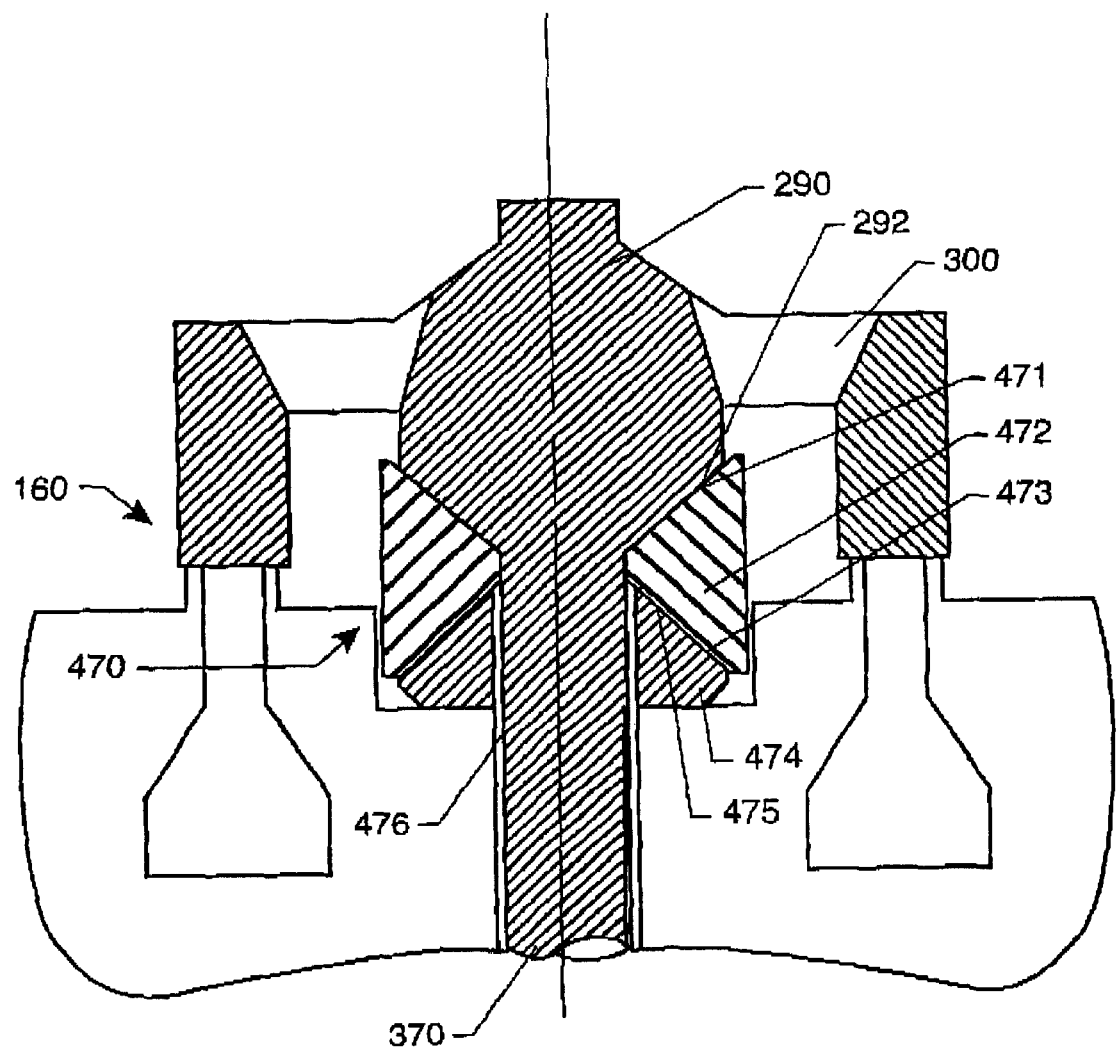
FIG. 16 shows a cross-section of a shock brake together with a valve holder body.

FIG. 16 shows an embodiment of the shock brake 470 in combination with a valve-plug holder 160 and a shaft 370. As in FIG. 13, the holder body 290 extends beyond the valve-plug holder 160 and couples the valve-plug holder 160 with the shaft 370. The junction between the holder body 290 and the shaft 370 includes an inclined surface 292 that corresponds to the inclined surface 525 of the first body 520 in FIG. 15. A first annular ring 472 serves as the equivalent of the second body 540 in FIG. 15. The first annular ring 472 includes an upper inclined surface 471 that is substantially parallel to the inclined surface 292 of the holder body 290. The first annular ring 472 also includes a lower inclined surface 473. A second annular ring 474 serves as a third body. It includes an upper inclined surface 475 that is substantially parallel to the lower inclined surface 473 of the first annular ring 472. In this embodiment, as the holder body 290 bears on the first annular ring 472 along the inclined surfaces 292 and 471 the first annular ring 472 elastically expands radially. Similarly, as the first annular ring 472 bears on the second annular ring 474 along the inclined surfaces 473 and 475 the second annular ring 474 elastically contracts radially. Preferably, a clearance 476 between the second annular ring 474 and the shaft 370 permits significant radial contraction of the second annular ring 474 without pinching the shaft 370. Frictional forces dissipate kinetic energy along inclined surface pairs 292/471 and 473/475. With this design, approximately 75% of the kinetic energy is dissipated during the downward motion. Additional annular rings can be added to provide more surfaces along which kinetic energy is dissipated.

Referring again to FIG. 14, a preferred assembly of the valve holder 160, the shaft 370, the return mechanism 450, and the shock brake 470 is shown. In this embodiment, four support shafts 590 (two of which are shown) provide structural support of the assembly. Included in the figure is an inlet connector 600, which connects a source of high-pressure fluid to an inlet plenum 610. The inlet plenum 610 corresponds to the outer volume 108 in FIGS. 1 and 3–9. The inner volume 107 in FIGS. 1 and 3–9 corresponds to an outlet plenum 620. An outlet connector 630 connects the outlet plenum 620 to the outside recipient of the fluid. The holder-body flow-through holes 300 provide access of inlet fluid to the inner edge of the annular valve seat (obscured). Although the location of the valve-plug holder 160 is shown, details of the valve-plug holder 160 are too small to discern at the scale of the figure and therefore were not rendered. The holder body 290 couples the valve-plug holder 160 to the shaft 370. In the embodiment illustrated in FIG. 14, any appropriate means can be used to actuate the shaft 370. Preferably, one of the impact actuators shown in FIGS. 11–13 and discussed above is used.

For a valve orifice area of about 100 mm$^2$, performance estimates suggest that cyclic operation with a period of 10 ms can be sustained with the valve-plug holder spending a total of about 2.5 ms in motion, approximately 2.0 ms of which will be spent in the open state (gap between the annular valve plug and the annular valve seat being greater than about half the distance between the inner and outer edges of the annular valve seat). To do this, the annular valve seat will have inner and outer radii of approximately 15.5 mm and 16.5 mm, respectively. Because of the small 1 mm distance between the inner and outer edges of the annular valve seat, a gap of approximately 0.5 mm between the annular valve seat and the annular valve plug is sufficient for the valve to be in the open state. The total stroke of the annular valve plug is estimated to be approximately 1.5 mm. The annular valve plug itself can be quite thin, a thickness of approximately 0.3 mm is estimated as being sufficient for most applications for which the inlet plenum gas pressure does not exceed 16 atmospheres. With reference to FIG. 10, approximately 0.1 ms will be spent on the interval OA, during which the valve-plug holder will move from its resting position to the point at which the lips contact the annular valve plug. During this time, the valve-plug holder will have accelerated to its maximum velocity of approximately 3 m/s. The interval AB is estimated to take approximately 0.2 ms and to move the annular valve plug to its open-position. The total cycle time OABCDEO is estimated to take approximately 2.5 ms. The shock braking occurs during the interval EO and is estimated to take approximately 0.1 ms.

Although the description above contains specific examples, these should not be construed as limiting the scope of the invention, but as merely providing illustrations of some of the presently preferred embodiments. Thus the scope of the invention should be determined by the appended claims and their legal equivalents, rather than by the examples given.

What is claimed is:

1. A valve, comprising:
   an annular valve seat;
   an annular valve plug; and
   a valve-plug holder that removes said annular valve plug from sealing contact with said annular valve seat to put said valve in an open state;
   wherein said valve-plug holder comprises a holder body, an inner lip coupled to said holder body, and an outer lip coupled to said holder body.

2. A valve, according to claim 1, further comprising a valve-plug-biasing member that biases said annular valve plug into contact with said annular valve seat when said valve is in a closed state.

3. A valve, according to claim 2, wherein said valve-plug biasing member is a wire spring.

4. A valve, comprising:
   an annular valve seat;
   an annular valve plug;
   a valve-plug holder that removes said annular valve plug from sealing contact with said annular valve seat to put said valve in an open state; and
   an actuator that provides movement to said valve-plug holder for changing the state of said valve;
   wherein said actuator comprises a shaft having first and second shaft ends, the first shaft end being coupled to said valve-plug holder, and an impactor that impacts the second shaft end to initiate a motion that changes the state of said valve, and wherein said impactor is propelled by an explosion.

5. A valve, comprising:
   an annular valve seat;
   an annular valve plug;

a valve-plug holder that removes said annular valve plug from sealing contact with said annular valve seat to put said valve in an open state; and an actuator that provides movement to said valve-plug holder for changing the state of said valve;

wherein said actuator comprises a shaft having a first and second shaft ends, the first shaft end being coupled to said valve-plug holder, and an impactor that impacts the second shaft end to initiate a motion that changes the state of said valve;

wherein said actuator further comprises a shock brake for dissipating kinetic energy associated with the motion of said shaft; and further wherein said valve-plug holder comprises a holder body, an inner lip coupled to said holder body, and an outer lip coupled to said holder body.

6. A valve, according to claim 5, wherein said shock brake comprises:

an inclined surface on said holder body near the junction of said support holder and said shaft;

a first annular ring having a lower inclined surface and an upper inclined surface, the upper inclined surface being adjacent and substantially parallel to the inclined surface on said holder body; and a second annular ring having an upper inclined surface adjacent and substantially parallel to the lower inclined surface of said first annular ring.

7. A valve, according to claim 6, wherein said actuator further comprises a return spring for returning said valve to a pre-actuation state, said return spring being coupled to said shaft.

8. A valve, according to claim 7, wherein said annular valve plug is a membrane that is sufficiently flexible so as to follow the shape of said annular valve seat.

9. A valve, according to claim 8, further comprising a wire spring that biases said annular valve plug into contact with said annular valve seat.

* * * * *